United States Patent [19]
Carpenter

[11] Patent Number: 5,810,273
[45] Date of Patent: Sep. 22, 1998

[54] ANTIJAMMING MECHANISM FOR A FISHING REEL

[75] Inventor: Robert Leon Carpenter, Tulsa, Okla.

[73] Assignee: Zebco Div. of Brunswick Corporation, Tulsa, Okla.

[21] Appl. No.: 565,364

[22] Filed: Nov. 30, 1995

[51] Int. Cl.[6] .................................................. A01K 89/015
[52] U.S. Cl. .......................................... 242/261; 242/262
[58] Field of Search ...................................... 242/261, 262

[56] References Cited

U.S. PATENT DOCUMENTS

| | | | |
|---|---|---|---|
| 5,163,635 | 11/1992 | Sato | 242/261 |
| 5,228,639 | 7/1993 | Sato | 242/262 |
| 5,322,239 | 6/1994 | Sato | 242/261 |
| 5,340,053 | 8/1994 | Morimoto | 242/261 |
| 5,350,133 | 9/1994 | Morimoto | 242/261 |
| 5,467,933 | 11/1995 | Miyazaki | 242/261 |

FOREIGN PATENT DOCUMENTS 78526   5/1985   Japan ..................................... 242/262

*Primary Examiner*—Daniel P. Stodola
*Assistant Examiner*—Emmanuel M. Marcelo
*Attorney, Agent, or Firm*—Wood, Phillips, VanSanten, Clark & Mortimer

[57] ABSTRACT

A fishing reel having a frame, a line carrying spool, first structure for mounting the line carrying spool to the frame for rotation about a first axis, and a reel operating mechanism that is placeable selectively in a) a cast state and b) a retrieve state. The reel operating mechanism includes a crank handle with a crank shaft and second structure responsive to operation of the crank handle for a) rotating the line carrying spool around the first axis to retrieve line onto the spool with the reel operating mechanism in a retrieve state and b) changing the reel operating mechanism from the cast state into the retrieve state. The second structure includes a slider that is movable relative to the frame between a first position with the reel operating mechanism in the retrieve state and a second position with the reel operating mechanism in the cast state. Third structure on the frame disengages the second structure to allow the line carrying spool to be rotated without operating the crank handle as an incident of the slider moving from its first position into its second position. Fourth structure cooperates between the slider and at least one of the frame and crank shaft for releasably maintaining the slider in the second position and for allowing the slider to be moved from the second position into the first position as an incident of the crank handle being operated. The fourth structure includes a kick lever and fifth structure cooperating between the kick lever and slider for both guiding relative pivoting movement between the kick lever and slider about a second axis and allowing limited movement of the kick lever relative to the slider in a path transversely to the second axis.

19 Claims, 8 Drawing Sheets

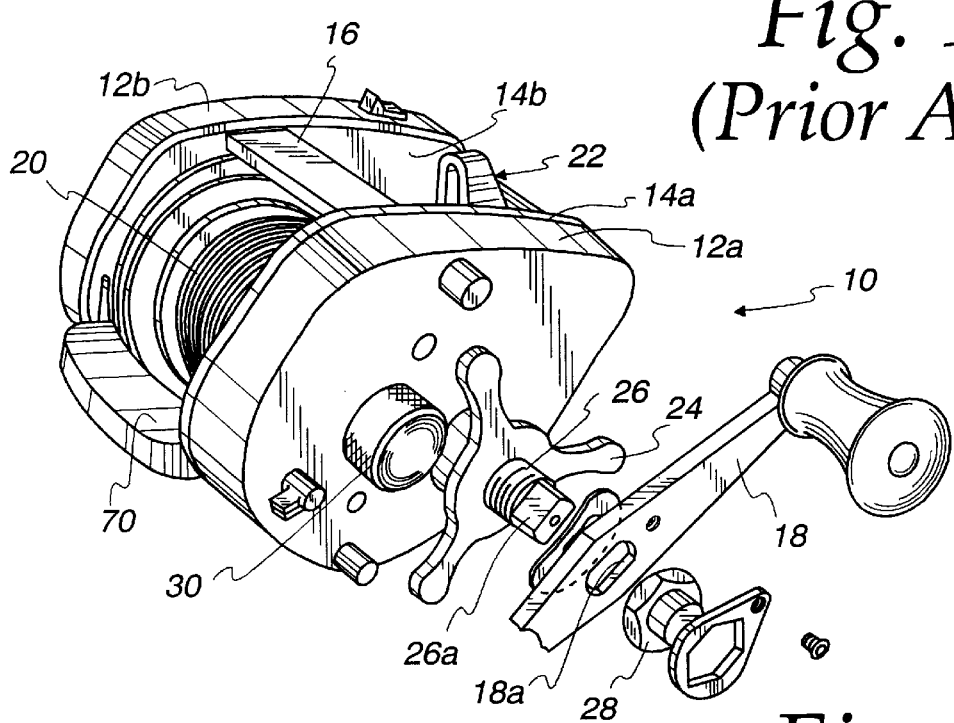

Fig. 4
(Prior Art)
Fig. 5
(Prior Art)
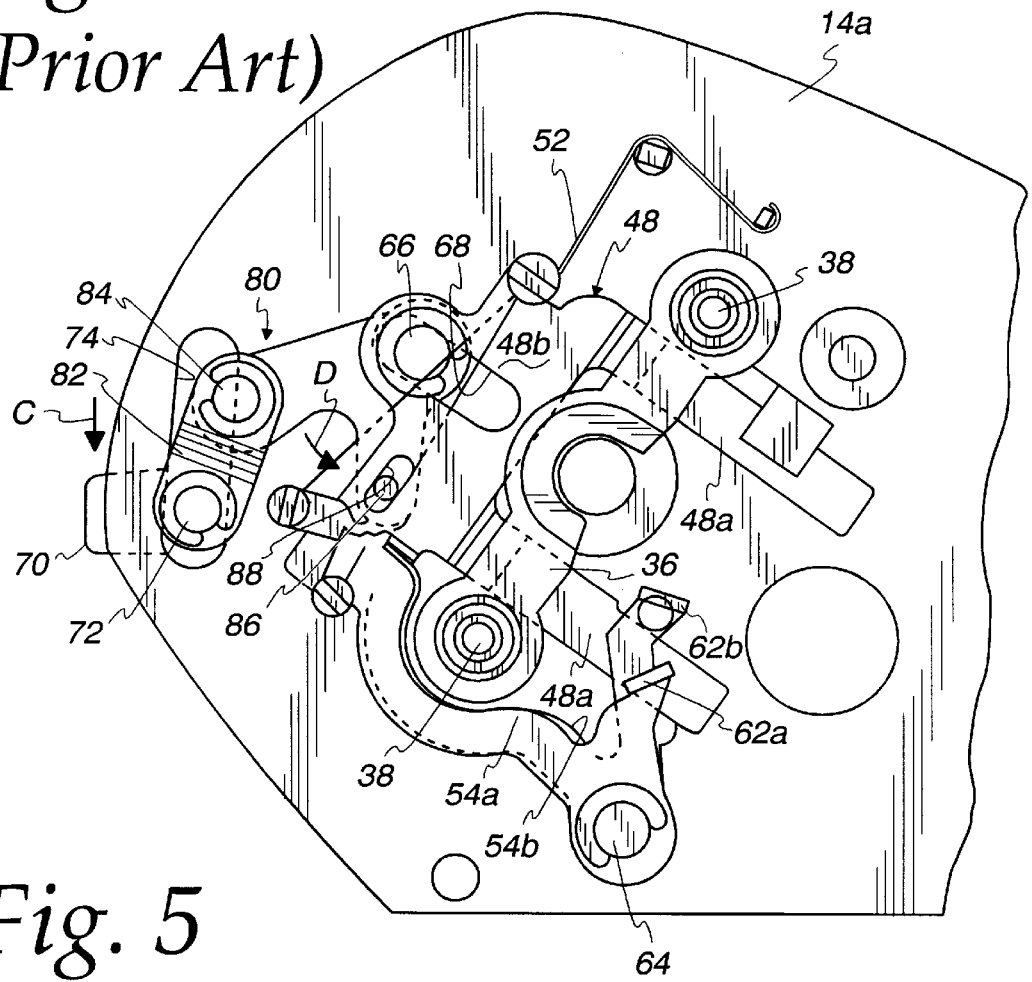
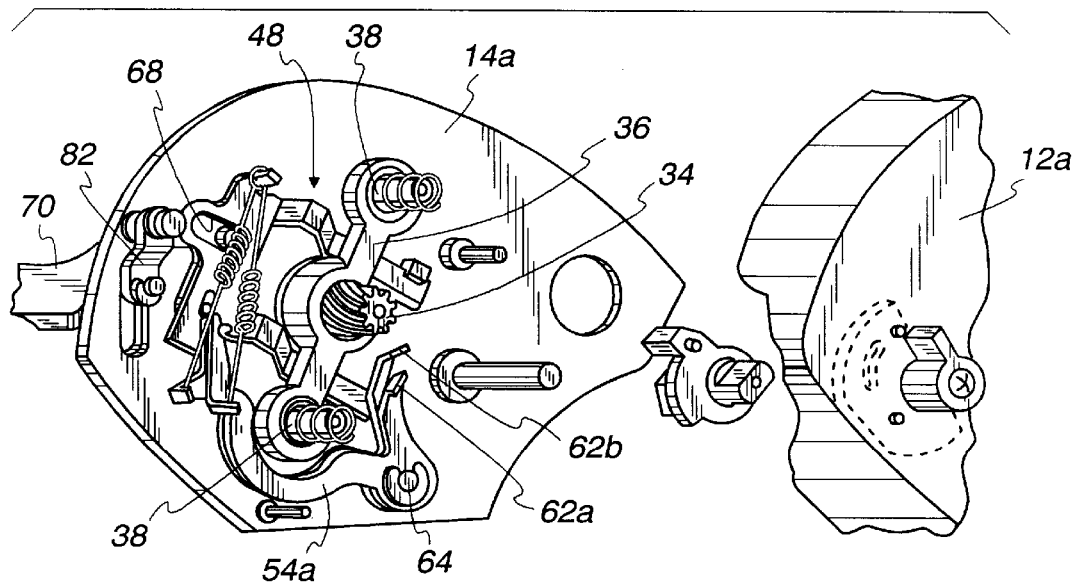

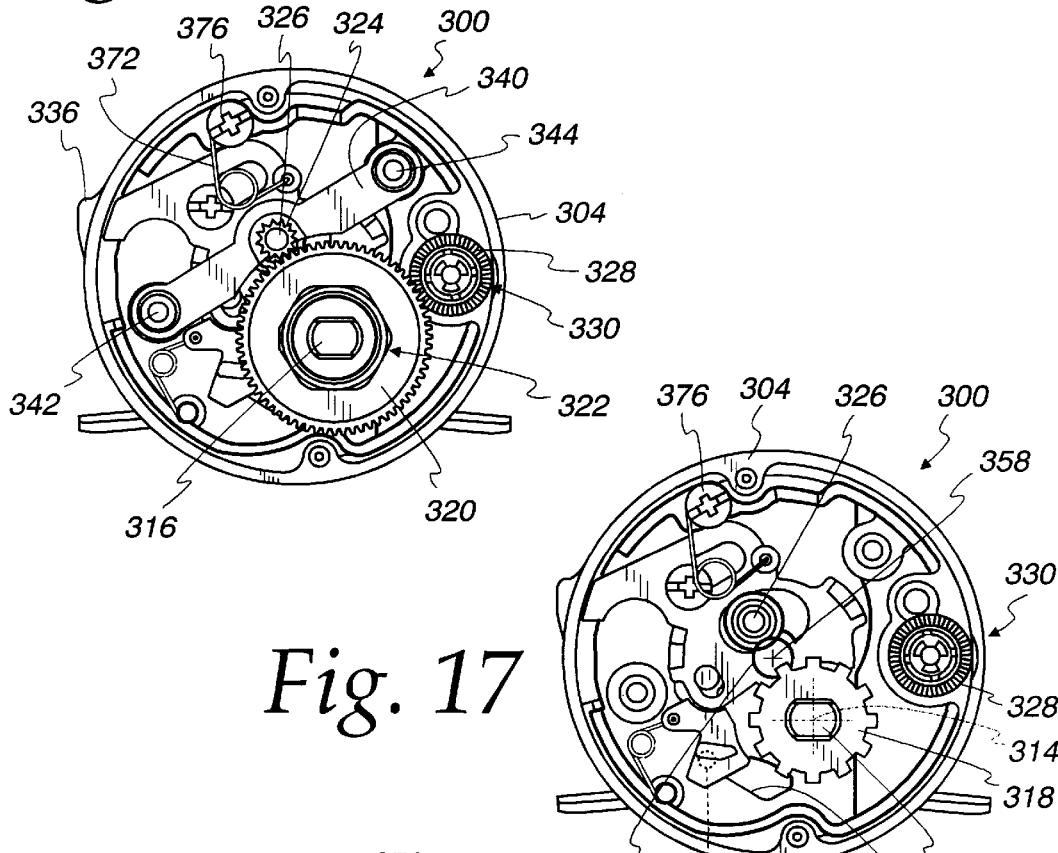
Fig. 16
Fig. 17
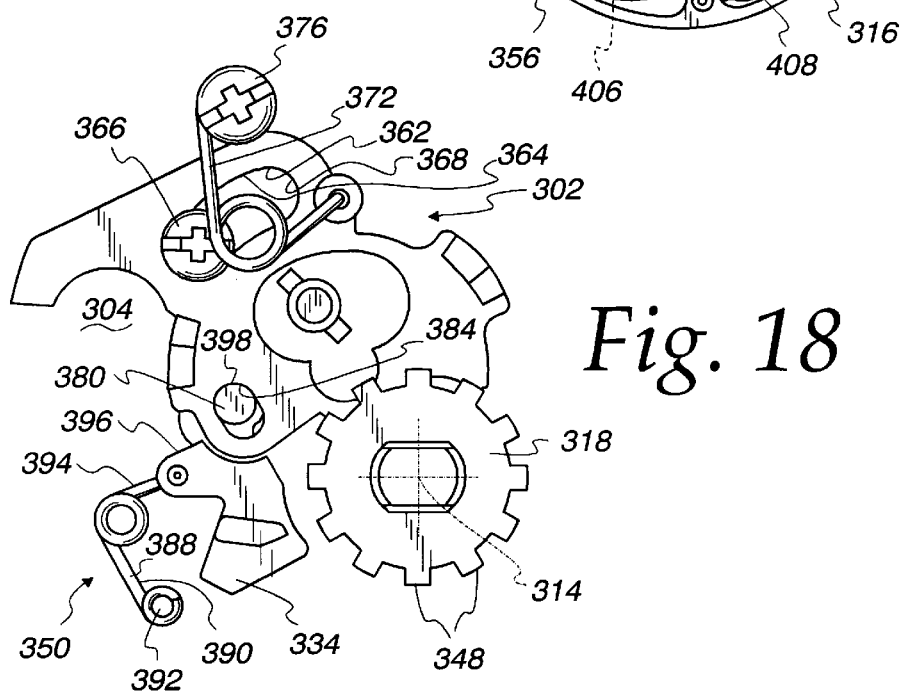
Fig. 18

ANTIJAMMING MECHANISM FOR A FISHING REEL

BACKGROUND OF THE INVENTION

1. Field of the Invention

This invention relates to fishing reels of the type having an actuating mechanism to selectively change the fishing reel from a retrieve state to a cast state and, more particularly, to a mechanism for preventing jamming of the actuating mechanism.

2. Background Art

In a conventional bait cast fishing reel, a rotatable, line carrying spool is operated through an external crank handle. To effect payout of line, as during a cast, a thumb button is depressed, thereby disengaging the spool from the crank handle while allowing the spool to freely rotate in a direction in which line pays out of the spool. It is desirable to construct such a mechanism so that it will releasably maintain itself in the cast position.

In one known prior art mechanism, a movable slider is operated through an external thumb button. In the retrieve state, the slider is in a first position and in a cast state, the slider is in a second position. As the slider is repositioned from its first position into its second position, the slider cams a yoke axially relative to the line carrying spool, as a result of which a pinion gear, which normally transmits a torque from a crank shaft to the line carrying spool, is disengaged. At the same time, a kick lever, which is pivotably connected to the slider, is repositioned so that a projection thereon is directed between adjacent teeth on a ratchet element, associated with the crank shaft. An overcenter spring biases the kick lever to the position wherein the projection resides between the ratchet teeth and thereby prevents reverse rotation of the crank shaft. Forward rotation of the crank shaft repositions the kick lever such that the overcenter spring associated therewith drives the kick lever and the slider on which it is mounted, to cause the slider to move from the second position back to the first position, i.e. to place the reel in the retrieve mode.

The kick lever has heretofore been connected to the slider through a pin and conforming slot arrangement. So long as the projection on the kick lever aligns between adjacent teeth upon depression of the thumb button, the reel will be changed to the cast state without any problem. However, in the event that the projection on the kick lever aligns with one of the ratchet teeth, in transition between the retrieve and cast states, the projection and kick lever will be prohibited from moving through its full range and will block movement of the slider into the second position, thereby preventing full disengagement of the pinion gear and latching of the mechanism to maintain the cast state.

Heretofore, this problem has been dealt with by simply turning the crank handle, after jamming occurs, sufficiently that the projection on the kick lever can move between the teeth. This is an inconvenience to the user. Further, a user that does not recognize that a slight turning of the crank handle can alleviate the jamming problem, may be inclined to exert a large force on the thumb button, thereby highly stressing the parts of the reel mechanism and potentially causing reel failure.

SUMMARY OF THE INVENTION

In one form of the invention, a fishing reel is provided having a frame, a line carrying spool, first structure for mounting the line carrying spool to the frame for rotation about a first axis, and a reel operating mechanism that is placeable selectively in a) a cast state and b) a retrieve state. The reel operating mechanism includes a crank handle with a crank shaft and second structure responsive to operation of the crank handle for a) rotating the line carrying spool around the first axis to retrieve line onto the spool with the reel operating mechanism in a retrieve state and b) changing the reel operating mechanism from the cast state into the retrieve state. The second structure includes a slider that is movable relative to the frame between a first position with the reel operating mechanism in the retrieve state and a second position with the reel operating mechanism in the cast state. Third structure on the frame disengages the second structure to allow the line carrying spool to be rotated without operating the crank handle as an incident of the slider moving from its first position into its second position. Fourth structure cooperates between the slider and at least one of the frame and crank shaft for releasably maintaining the slider in the second position and for allowing the slider to be moved from the second position into the first position as an incident of the crank handle being operated. The fourth structure includes a kick lever and fifth structure cooperating between the kick lever and slider for both guiding relative pivoting movement between the kick lever and slider about a second axis and allowing limited movement of the kick lever relative to the slider in a path transversely to the second axis.

The reel may include structure cooperating between the slider and frame for normally biasing the slider towards the first position.

The reel operating mechanism may include a thumb button, with structure cooperating between the thumb button and frame for mounting the thumb button to the frame for movement relative to the frame between engaged and disengaged positions, and structure cooperating between the thumb button and slider for moving the slider from its first position into its second position as an incident of the thumb button moving from its disengaged position into its engaged position.

In one form, the fifth structure is defined by a post on one of the kick lever and slider and a slot for receiving the post on the other of the kick lever and slider.

This slot may have an oval shape.

Structure may be provided cooperating between the kick lever and frame for guiding movement of the kick lever relative to the frame between the engaged and disengaged positions.

In one form, the crank shaft has a rotational axis, the kick lever has a projection, there is a ratchet element on the crank shaft with a plurality of teeth spaced around the rotational axis of the crank shaft, and with the kick lever in the engaged position, the projection on the kick lever resides between adjacent teeth and blocks rotation of the crank shaft in one direction around the rotational axis of the crank shaft.

Spring structure may be provided to bias the kick lever into each of the engaged and disengaged positions.

In one form, the spring structure is a single piece of formed wire.

The second structure may include a pinion gear, structure cooperating between the pinion gear and line carrying spool for transmitting a torque applied to the pinion gear to the line carrying spool to effect rotation thereof, and structure cooperating between the crank shaft and pinion gear for transmitting a torque applied to the crank shaft to the pinion gear to effect rotation thereof. The third structure may reposition the pinion gear relative to at least one of the crank shaft and line carrying spool to allow the pinion gear to rotate without transmitting a torque on the pinion gear through the one of the crank shaft and line carrying spool.

In one form, the third structure includes a yoke, structure cooperating between the frame and yoke for mounting the yoke for movement relative to the frame for movement axially relative to the first axis between a first position and a second position. The second structure may further include structure cooperating between the slider and yoke for moving the yoke from its first position into its second position as an incident of the slider moving from its first position into its second position and structure cooperating between the yoke and pinion gear for repositioning the pinion gear relative to the at least one of the crank shaft and line carrying spool to allow the pinion gear to rotate without transmitting a torque through the pinion gear to the one of the crank shaft and line carrying spool as an incident of the yoke moving from its first position into its second position.

The structure cooperating between the kick lever and frame may include a projection on one of the kick lever and frame and a slot for receiving the projection on the other of the kick lever and frame.

The structure cooperating between the slider and frame for biasing the slider towards the first position may be a single, formed piece of wire.

In another form of the invention, a fishing reel is provided having a line carrying spool, first structure for mounting the line carrying spool to the frame, and a reel operating mechanism that is placeable selectively in a) a cast state and b) a retrieve state. The reel operating mechanism has a crank handle and second structure responsive to operation of the crank handle for a) directing line onto the line carrying spool and b) changing the reel operating mechanism from the cast state into the retrieve state. The second structure includes a slider that is movable relative to the frame between a first position with the reel operating mechanism in a retrieve state and a second position with the reel operating mechanism in the cast state. Third structure disengages the second structure to allow the line carrying spool to be rotated without operating the crank handle as an incident of the slider moving from its first position into its second position. Fourth structure cooperates between the slider and at least one of the frame and crank shaft for releasably maintaining the slider in the second position and for allowing the slider to be moved from the second position into the first position as an incident of the crank handle being operated. The fourth structure includes a ratchet with a plurality of spaced teeth thereon, a kick lever with a projection thereon, and fifth structure cooperating between the kick lever and at least one of the frame and slider for guiding movement of the kick lever relative to the slider between an engaged position, wherein the projection on the kick lever extends between adjacent teeth on the ratchet, and a disengaged position. The second structure includes sixth structure on at least one of the ratchet frame, slider and kick lever to prevent jamming of the kick lever by abutment of the projection on the kick lever against one of the ratchet teeth as the kick lever moves from its disengaged position towards its engaged positions.

The fifth structure may guide pivoting movement of the kick lever between the engaged and disengaged positions.

The sixth structure may guide translatory movement of the kick lever relative to the slider.

In one form, the slider is a substantially flat plate.

BRIEF DESCRIPTION OF THE DRAWINGS

FIG. 1 is a perspective view of a conventional casting type fishing reel, with an exploded presentation of the components of a handle;

FIG. 2 is an isolated elevational view, on an enlarged scale, illustrating the disengaged positions of a clutch and an actuator therefor;

FIG. 3 is fragmented section taken generally along line 3—3 of FIG. 2;

FIG. 4 is a view similar to that of FIG. 2, with the clutch mechanism and actuator in engaged positions;

FIG. 5 is a perspective view of the clutch mechanism and actuator in disengaged positions;

FIG. 16 is a side elevation view of the reel in FIG. 15 with the side cover thereon removed to expose the actuating mechanism and with the reel operating mechanism in a retrieve state;

FIG. 17 is a view as in FIG. 16 with elements of the actuating mechanism removed to expose the inventive antijamming structure;

FIG. 18 is an enlarged, side elevation view of the actuating mechanism and antijamming structure in FIGS. 15–17 and with the reel operating mechanism in a retrieve state;

DETAILED DESCRIPTION OF THE DRAWINGS

Figure 6:
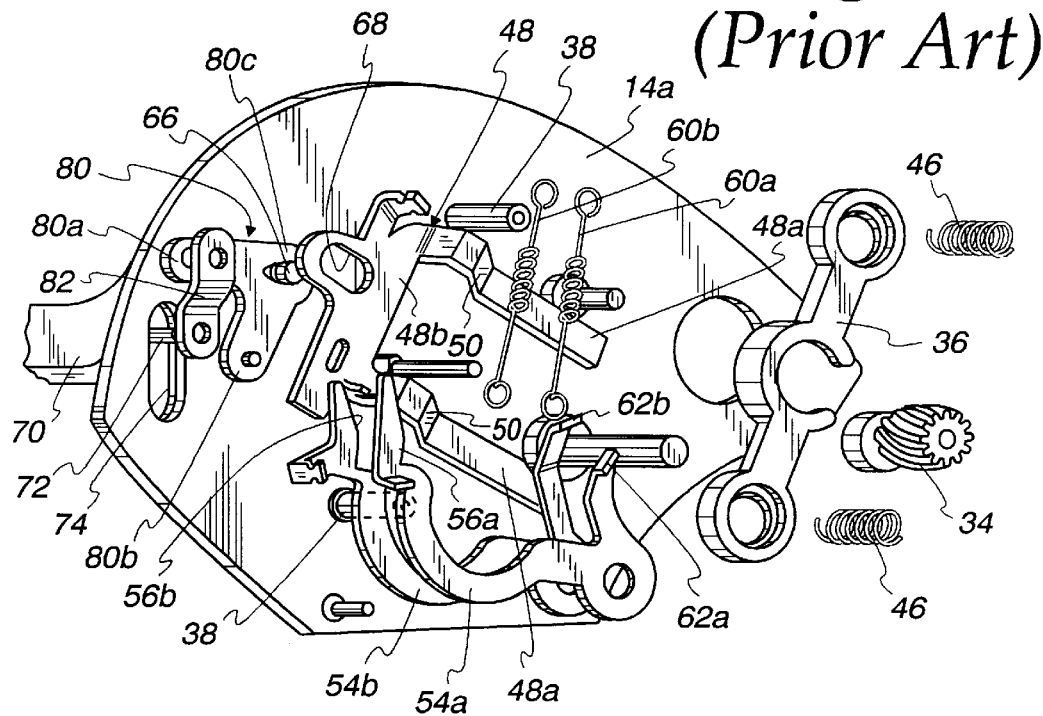
FIG. 6 is an exploded perspective view, on an enlarged scale, of the clutch mechanism and actuator.

Referring to the drawings in greater detail, and first to FIG. 1, a conventional casting type fishing reel is shown and generally designated 10. The reel includes a housing defined by a pair of side cover members 12a and 12b. The housing includes a pair of side frame members 14a and 14b with a plurality of spacer posts 16 (only one of which is visible in the FIG.) extending transversely therebetween. A handle 18 is rotatably mounted on the outside of cover 12a for rotating a spool 20 to retrieve fishing line, as is conventional. A level wind mechanism, generally designated 22, is provided for traversing spool 20 during winding the fishing line thereon. A conventional star wheel 24 is threaded onto a crank shaft 26, the star wheel being operatively associated with a drag mechanism of the reel. The handle 18 includes a rectangular hole 18a which is shaped complementary to a rectangularly shaped distal end 26a of crank shaft 26 for rotating the crank shaft and, therefore, the spool and other operative components of the reel. The distal end of the crank shaft is externally threaded for receiving a nut 28 for securing the handle to the distal end of the crank shaft. A cup-shaped hub bearing cap 30 is shown exteriorly of side cover 12a and positioned as described below.

Figure 7:
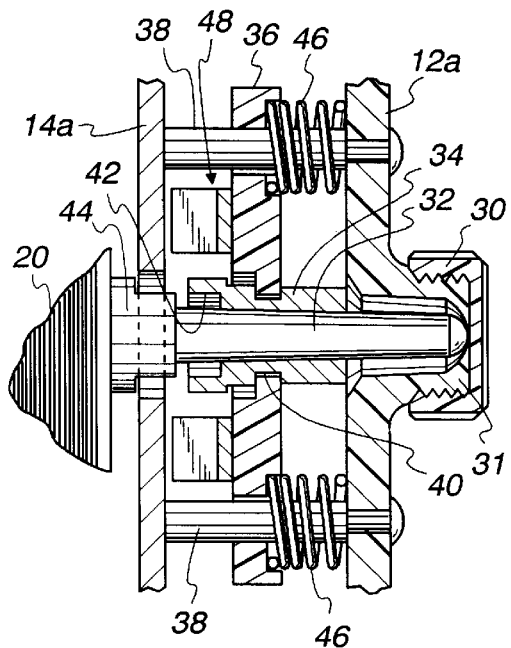
FIG. 7 is a fragmented section, on an enlarged scale, depicting the disengaged position of the pinion gear and the associated components of the clutch mechanism.
Figure 8:
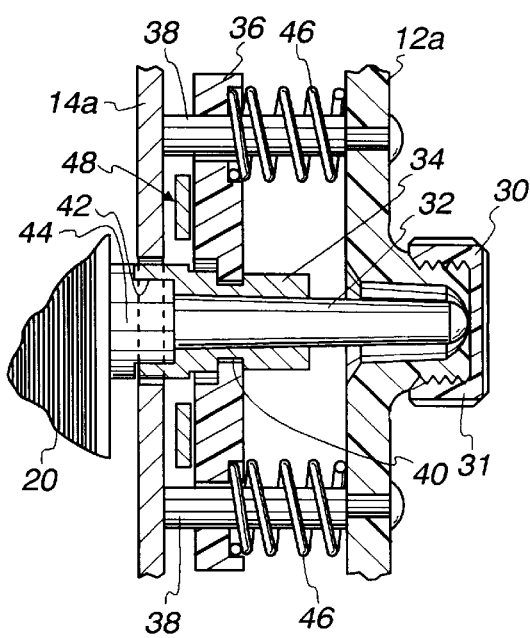
FIG. 8 is a view similar to that of FIG. 7 with the pinion gear and clutch components in engaged positions.

FIGS. 7 and 8 show hub bearing cap 30 threaded onto a boss 31 of cover 12a for receiving and providing a pilot for a spool shaft 32 of spool 20. Generally, clutch means are provided for selective actuation to disengage a spool pinion gear 34 from spool shaft 32 to permit the spool to free-wheel during casting, and to automatically reengage the pinion gear with the spool shaft immediately in response to initial rotation of handle 18 to retrieve the fishing line. More particularly, a carrier plate 36 is mounted on a pair of posts 38 formed integrally with or projecting axially from side plate 14a, whereby the carrier plate is movable generally parallel to spool shaft 32. Carrier plate 36 seats within an annular recess 40 in pinion gear 34 for axially moving the gear with the carrier plate.

FIG. 7 shows pinion gear 34 in its disengaged position and FIG. 8 shows the pinion gear in its axial position of engagement with the spool. To this end, pinion gear 34 has an irregularly shaped socket 42 which meets with a complementarily irregularly shaped enlarged portion 44 of spool shaft 32 to drive the spool shaft. When in disengaged position, spool 20 is free to rotate for casting purposes. A pair of coil springs 46 are sandwiched between carrier plate 36 and right-hand cover 12a to bias the carrier plate and pinion gear 34 automatically back to the position of engagement of the pinion gear. The structure and function of pinion gear 34, carrier plate 36, etc., generally are known in the art. The carrier plate and pinion gear are movable axially of spool shaft 32 by a clutch plate, generally designated 48.

Referring back to FIGS. 2–6, details of the clutch means and actuator means now will be described. With the description of FIGS. 7 and 8, the position of pinion gear 34 and carrier plate 36 in relation to the clutch mechanism are illustrated and their function and operation now can be better understood. In addition, the positions of the components of the clutch means with the pinion gear in engaged condition are shown in FIGS. 2, 3, 5 and 6. The position of the components of the clutch mechanism with the pinion gear and carrier plate in disengaged or free casting condition are shown in FIG. 4.

More particularly, clutch plate 48 is generally U-shaped and is slidably mounted on frame plate 14a for generally linear movement perpendicular to spool shaft 32 in the direction of double-headed arrow "A" (FIG. 2). The U-shaped clutch plate has a pair of legs 48a joined by a cross or bight portion 48b. The legs underlie carrier plate 36. Each leg of the clutch plate has an inclined cam ramp portion 50 which, upon movement in the direction of arrow "B" (FIG. 2) are effective to "lift" the carrier plate and disengage the pinion gear from the spool shaft as described in relation to FIGS. 7 and 8. In other words, when clutch plate 48 is moved from the position shown in FIG. 2 to the position shown in FIG. 4, the spool is conditioned for free rotation for casting purposes.

A spring 52 (FIGS. 2 and 4) normally biases clutch plate 48 toward its disengaged condition. Upper and lower latch devices 54a and 54b, respectively, have shoulders 56a and 56b, respectively, which seat behind a latch post 58 projecting from clutch plate 48. These latch devices are biased by springs 60a and 60b, respectively, toward latching condition such that shoulders 56a, 56b are held behind latch post 58 until released. After a cast by a fisherman, upon initial rotation of handle 18 and crankshaft 26, ratchet means, not shown, on the crankshaft will engage release tongues 62a and 62b of latch devices 54a and 54b, respectively, to pivot the latch devices about pivot pin 64 and move shoulders 56a, 56b from out of engagement with latch post 58 of clutch plate 48. Thereupon, spring 52 will move the clutch plate back opposite the direction of arrow "B". Linear movement of the clutch plate is guided by a post 66 projecting from frame plate 14a and into an elongated slot 68 in the clutch plate, the elongated slot extending generally in the direction of linear movement of the clutch plate (i.e. arrows "A" and "B"). The general operation of such a U-shaped clutch plate is known.

Actuator means, including a thumb button or bar 70 exposed exteriorly of the reel, are provided for effecting linear movement of clutch plate 48. The actuator means itself is mounted on the reel housing for generally linear movement oblique to the linear movement of the clutch plate.

More particularly, as seen in FIG. 3, thumb bar 70 has a pin 72 which extends through an elongated slot 74 in side frame plate 14a. Actually, as shown in FIG. 3, side frame plate 14a is covered by an inner covering plate 76 also having an elongated slot 78 through which pin 72 extends. As shown in FIGS. 2 and 4, slot 74 (and slot 76) define a linear path of travel for thumb bar 70 as indicated by arrow "C" (FIG. 4). This linear path of travel is oblique to that of clutch plate 48 as indicated by arrows "A" and "B" in FIG. 2. Movement of the thumb bar is effected simply by a fisherman pushing down on the bar with his thumb in the direction of arrow "C". Contrary to arcuately moveable thumb buttons or bars, or bars which are pivotally mounted, this linear movement gives considerable ease of operation.

Generally, motion transmitting means are provided operatively associated between the actuator means, including thumb bar 70, and the clutch means, including clutch plate 48, for linearly moving the clutch plate and the pinion gear 34 in response to linear movement of the actuator means. More particularly, cam lever means in the form of a bell crank, generally designated 80, is connected by lost motion means between the actuator means and the clutch means. The configuration of bell crank 80 can best be seen in FIG. 4 and the perspective view of FIG. 6. The bell crank includes first and second legs 80a and 80b, respectively, meeting at a juncture 80c. The bell crank is pivoted on post 66 which projects through elongated slot 68 in clutch plate 48. Leg 80a is operatively associated with the actuator means and leg 80b is operatively associated with the clutch means.

Specifically, the lost motion means between leg 80a of bell crank 80 and thumb bar 70 comprises a link arm 82 pivotally connected at one end to pin 72 and pivotally connected at its opposite end to the distal end of leg 80a by a pin 84.

The lost motion means between bell crank 80 and clutch plate 48 comprises a pin-and-slot construction including a pin 86 projecting from the distal end of leg 80b of the bell crank into a lost motion, elongated slot 88 in bight portion 48b of clutch plate 48.

With the above-described structure, it can be understood that when a fisherman desires to effect free rotation of spool 20 for casting, he depresses thumb bar 70 in the direction of arrow "C" (FIG. 4). This causes the actuator means and clutch means to move from the condition of the components shown in FIG. 2 (as well as FIGS. 5 and 6) to the condition of the components shown in FIG. 4. Specifically, rotation of bell crank 80 in the direction of arrow "D", through the above-described lost motion means, is effective to convert linear movement of the thumb bar to the oblique linear movement of clutch plate 48. In essence, the ease and operation of linearly movable parts is afforded, while the motion transmitting means in the form of bell crank 80 provides a mechanical advantage for efficiently transmitting forces from the thumb bar to the clutch plate.

Figure 9:
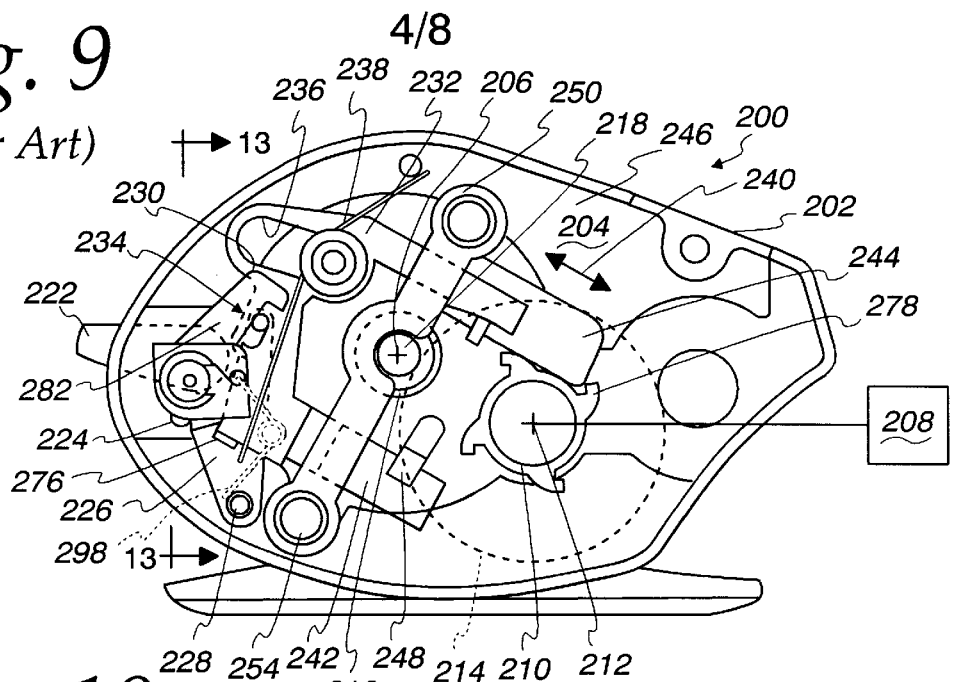
FIG. 9 is a side elevation view of a conventional casting-type fishing reel having a side cover plate removed and with a structure according to the present invention for selectively preventing latching of the reel in a cast mode, the reel being shown in a retrieve mode with the latch preventing structure in its "off" position.
Figure 10:
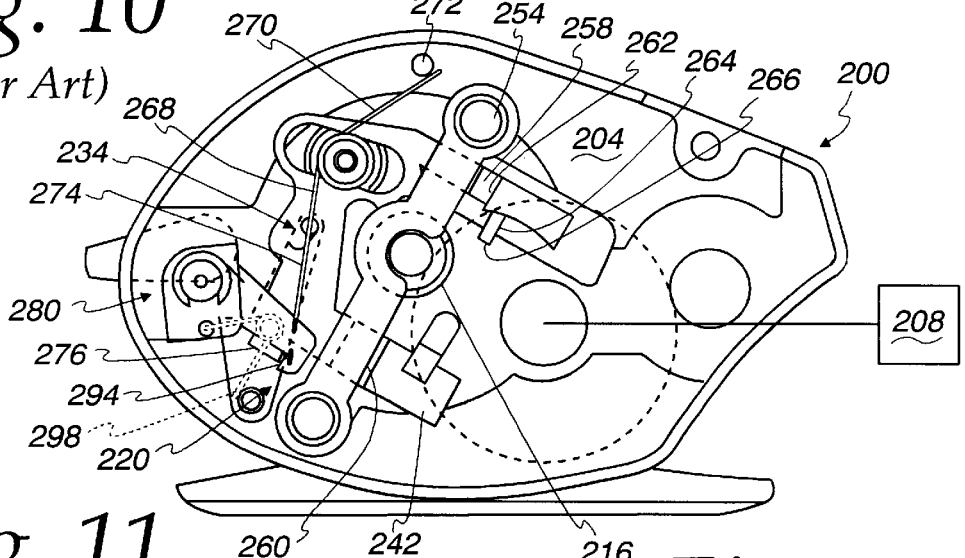
FIG. 10 is a view similar to that in FIG. 9 with the latch preventing structure in its "on" position and the reel in an unlatched cast mode.
Figure 11:
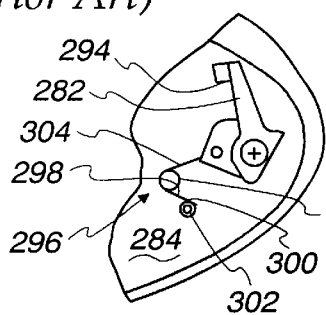
FIG. 11 is a fragmentary side elevation view of a side cover plate taken from the side opposite that in FIG. 9 and showing the inventive latch preventing structure in its "off" position.
Figure 12:
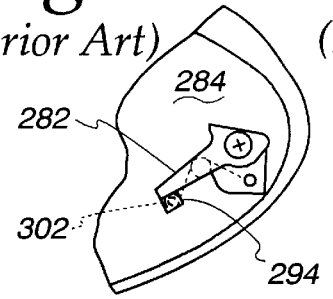
FIG. 12 is a view similar to that in FIG. 11 with the latch preventing structure in its "on" position.
Figure 13:
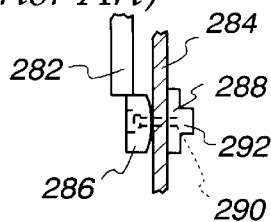
FIG. 13 is a cross-sectional view of the latch preventing structure taken along line 13—13 of FIG. 9.
Figure 14:
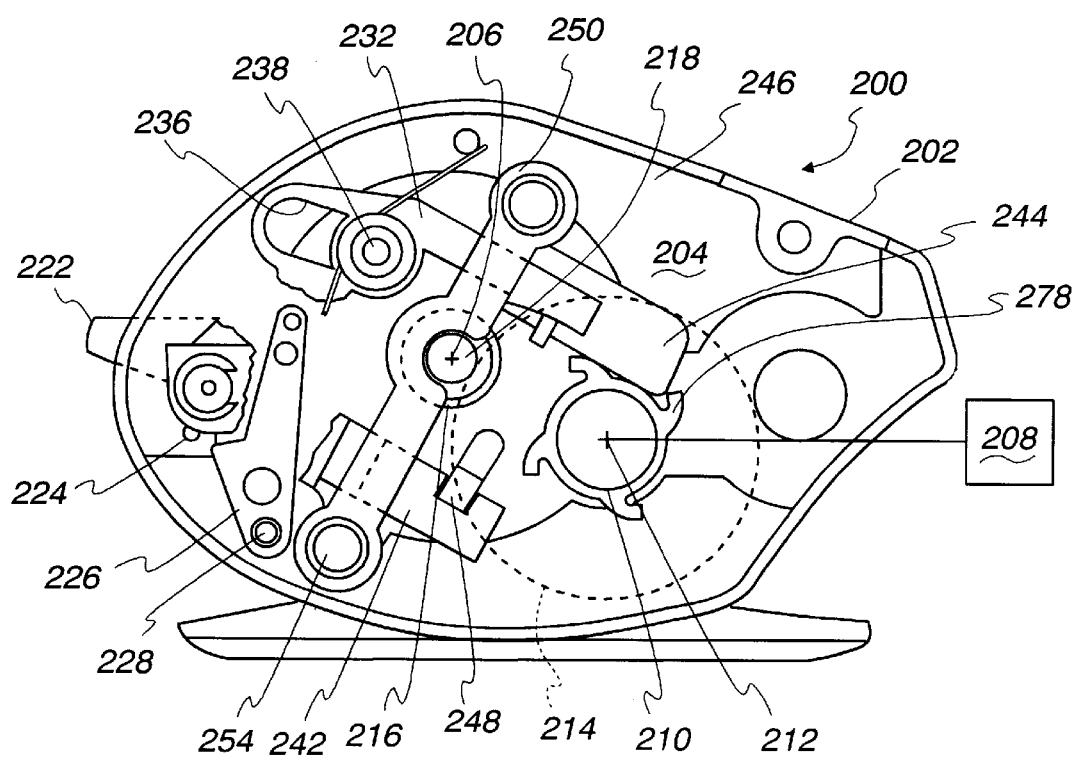
FIG. 14 is a side elevation of the fishing reel having a side cover plate removed and some elements removed or partially cut away to reveal underlying structures.
Figure 15:
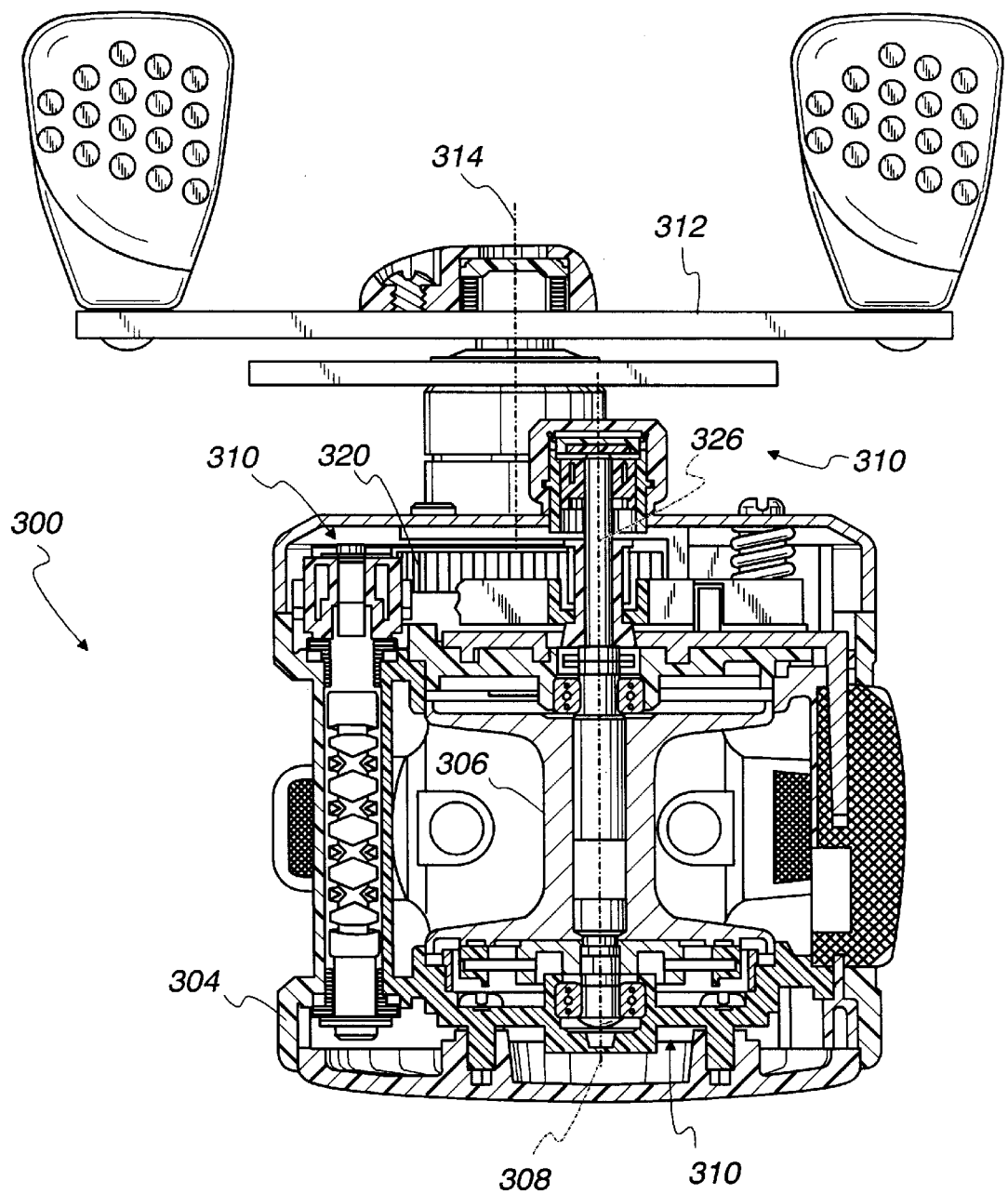
FIG. 15 is a cross-sectional plan view of a bait cast fishing reel incorporating a preferred form of reel operating mechanism including an actuating mechanism for changing the reel operating mechanism from its retrieve state to its cast state and with inventive structure incorporated therein for preventing jamming of the actuating mechanism.

Another form of conventional bait cast reel, is shown at 200 in FIGS. 9–13. The bait cast reel 200 operates in a fashion similar to the reel earlier described with respect to FIGS. 1–8. As in the prior reel, the reel 200 has a housing 202 with side frame members 204 (one shown) between which a line carrying spool (not shown) is mounted for rotation about a laterally extending axis 206. The means for rotating the spool to effect line retrieval is indicated schematically at 208 and normally consists of a rotatable crank handle which drives a shaft 210 about a laterally extending axis 212. The shaft 210 carries a gear 214 which, with the reel 200 in its retrieve mode of FIG. 9, is in mesh with a gear 216 on the spool shaft 218.

A spool control means, indicated generally at 220, is provided for selectively disengaging the spool from the spool rotating means 208 and for allowing the spool to rotate freely in a direction to allow line to pay out of the spool with the fishing reel in a cast mode. The spool control means 220 is operated by a thumb button 222 which is pivotable between first and second positions about a laterally extending axis in a counterclockwise direction in FIGS. 9 and 10 to effect change of the reel from its retrieve mode to its cast mode. Depression of the thumb button 222 causes a laterally extending pin 224 thereon to bear against a link arm 226 to pivot the link arm 226 about a pin 228. This pivots the arm end 230 remote from the pin 228 in a clockwise direction in FIGS. 9 and 10, which in turn effects substantially translatory movement of a sliding clutch plate/latching element 232 from a first position, shown in FIG. 9, towards a second position in which the clutch plate/latching element 232 is shifted towards the right from the FIG. 9 position. This transfer movement is effected through a pin and slot connection at 234.

The clutch plate/latching element 232 has an elongate slot 236 to accept a pin 238 on the housing 202 so that the clutch plate/latching element 252 is guided in a substantially linear path, indicated by the double-headed arrow 240, between its first and second positions. Laterally inwardly facing surfaces (not shown) on spaced legs 242, 244 associated with clutch plate/latching element 232, facially abut and are guided against the laterally outwardly facing surface 246 on the side frame member 204. A boss 248 on the side frame member 204 maintains the leg 242 in intimate contact with the frame surface 246 in operation.

As in the prior reel, a carrier plate 250 is mounted on the side frame member 204, with lateral movement thereof being guided by spaced posts 254. In the retrieve mode for the reel 200, shown in FIG. 9, the gear 216 is meshed with the gear 214 rotated by the crank handle 208 so that the axes of the gears 214, 216 are parallel. Depression of the thumb button 222 from its first position in FIG. 9 causes the clutch plate/latching element 232 to shift to the right from the FIG. 9 position, thereby causing ramp surfaces 258, 260 on the clutch plate/latching element 232 to progressively bias the carrier plate 250 laterally outwardly. The carrier plate 250 shifts the gear 216 to its second position out of mesh with the gear 214 so that the spool is free to rotate to allow the payout of line. With the clutch plate/latch member 232 shifted fully to the right to its second position, a latching shoulder 262 thereon moves past an oppositely facing shoulder 264 on a boss 266 on the side frame member 204. As this occurs, the clutch plate 232 is biasably canted slightly in a counterclockwise direction about the pin 238 to place the shoulders 262, 264 in abutting relationship so as to prohibit shifting of the clutch plate 232 back to its first position. The shoulders thereby define means for maintaining the reel in its cast mode. This counterclockwise shifting is effected by a wire spring 268 coiled about the pin 238. The spring 268 has one leg 270 loaded against a post 272 on the side frame member 204 and an opposite leg 274 bearing on a tab 276 projecting laterally outwardly from the clutch plate/latching element 232.

To change the reel from the cast mode to the retrieve mode, the shaft 210 is operated through the crank handle 208 in a clockwise direction to rotate a trip gear 278 to deflect the clutch plate 232 slightly upwardly and in a counterclockwise direction to allow the spring leg 268 to drive the carrier plate 250 back into its first position and thereby place the reel in its retrieve mode.

A means at 280 is provided for selectively preventing the clutch plate/latching element 232 from latching in its second position. To accomplish this, an arm 282 is pivotably mounted on the cover plate 284 which is secured on the side frame member 204. The arm 282 is carried on a knob 286 which is operatively joined to a control head 288 at the outside of the fishing reel. A screw 290 extends from inside out through the knob 286, the cover plate 284 and into the control head 288 to hold the parts in assembled relationship. The control head 288 has a rib 292 to facilitate its being gripped by a user and turned together with the associated arm 282.

With the arm 282 in the "off" position of FIG. 9, the spool control means 220 operates as previously described. However, with the arm 282 moved to its "on" position of FIG. 11, which is accomplished by rotating the knob 286 through the control head 288 in a clockwise direction, a shoulder 294 on the arm 282 is placed in the path of the tab 276 on the clutch plate 232 as the clutch plate 232 moves between its first and second positions. The shoulder 294 abuts the tab 276 before the clutch plate 232 realizes its second position and before the shoulders 262, 264 can latch. However, the clutch plate 232 movement is sufficient to disengage the gear 216 from the gear 256 so that the line can be cast by the user. The line can be cast and paid out by the user so long as the thumb button 222 remains depressed. Upon release of the thumb button 222, the spring leg 274 drives the clutch plate 232 back towards its first position and through the pin and slot connection at 234 pivots the link arm 226 and in turn the thumb button 222 back to their first positions. The reel 200 then automatically assumes the retrieve position without the user having to operate the crank handle 208.

To allow the user to sense the "on" and "off" positions for the preventing means 280, an overcenter spring arrangement is provided at 296. The overcenter spring 296 consists of a formed wire 298 having a center coil 299, a first arm 300 anchored to a post 302 on the cover plate 284 and a second arm 304 pivotably engaging the knob 286. It can be seen in FIGS. 11 and 12 that the loaded arm 304 drives the knob 286 positively into each of the "on" and "off" positions therefor.

The overcenter arrangement also gives the user a feel when the "on" and "off" positions are achieved.

Best Mode For Carrying Out the Invention

In FIGS. 15–20, a preferred form of fishing reel, according to the present invention, is shown at 300. The fishing reel 300 is the same type of fishing reel as shown in FIGS. 1–14, with the modification being principally in the actuating mechanism at 302 which is responsible for changing the reel 300 between cast and retrieve states.

Briefly, the fishing reel 300 has a frame 304 to which a line carrying spool 306 is mounted for rotation about a laterally extending axis 308. A reel operating mechanism at 310, of which the actuating mechanism 302 is a part, is mounted upon the frame 304.

The reel operating mechanism 310 includes an external crank handle 312 which is rotatable about an axis 314. The crank handle 312 is keyed to a crank shaft 316 to which a ratchet element 318 is in turn keyed to follow rotation thereof about the axis 314.

The crank shaft 316 also carries a main drive gear 320 which follows rotation of the crank shaft 316 through frictional forces developed between the crank shaft 316 and the drive gear 320 by a stack of washers 322, an arrangement that is well known to one skilled in the art. The drive gear 320 is in mesh with a pinion gear 324, which is carried on a laterally projecting shaft 326 that is part of the line carrying spool 306.

By turning the crank handle 312, the crank shaft 316 is operated to rotate the drive gear 320 and thereby the pinion gear 324 so that the line carrying spool 306 rotates in a direction to retrieve line onto the spool 306. At the same time, the gear 320 is in mesh with and drives a gear 328 associated with a level wind guide mechanism 330, of conventional construction. The level wind guide mechanism 330 causes an even distribution of retrieved line over the lateral extent of the line carrying spool 306.

Figure 20:
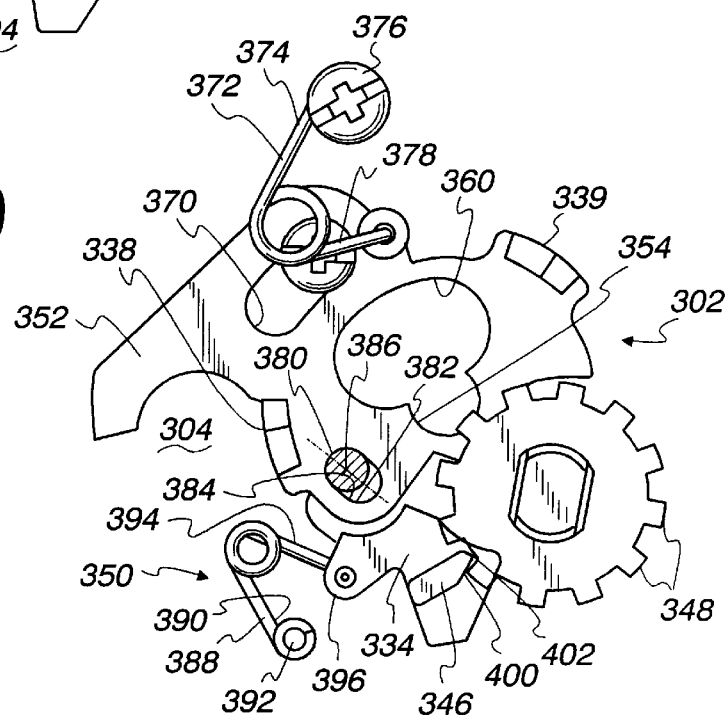
FIG. 20 is a view as in FIGS. 18 and 19 with the reel operating mechanism in a cast state.

The actuating mechanism 302 includes a slider 332 and a kick lever 334 cooperating between the slider 332 and the ratchet 318. Through an external thumb button 336, that is depressible to be moved from a disengaged position to an engaged position, the slider 332 is moved from a first position, shown in FIG. 18 and corresponding to the retrieve position, to a second position, as shown in FIG. 20, corresponding to the cast position for the reel. As the slider 332 moves between its first and second positions, spaced cam surfaces 338, 339 on the slider 332 progressively bias a yoke 340, as in the previously described reel, laterally outwardly to thereby reposition the pinion gear 324, from a position wherein the pinion gear 324 is keyed to the shaft 326 to follow rotation thereof, to a laterally outward, disengaged position wherein the pinion gear 324 spins freely upon the shaft 326, thereby allowing the line carrying spool 306 to rotate without effecting movement of the crank handle 312. This represents the cast state for the reel operating mechanism 310 wherein line can be freely paid off of the line carrying spool 306, as to effect a cast.

As in the prior reel, the yoke 340 is mounted to slide guidingly upon laterally extending posts 342, 344 between first and second laterally spaced positions and is keyed to the pinion gear 324 so that the pinion gear 324 follows lateral movement of the yoke 340. The yoke 340 is normally biased laterally inwardly so that the pinion gear 324 is keyed to the shaft 326 to follow rotation thereof.

As the slider 332 moves from its first position into its second position, the kick lever 334 moves from a disengaged position, shown in FIG. 18, to an engaged position, shown in FIG. 20. In the engaged position, a projection 346 on the kick lever 334 extends between adjacent teeth 348 disposed around the periphery of the ratchet 318 and the axis 314. Through an overcenter spring arrangement at 350, the kick lever 334 is driven into its engaged position as the slider 332 approaches its second position. This arrangement causes the slider 332 to be latched into its second position and the reel operating mechanism 310 to thereby be maintained in the cast state.

More particularly, the slider 332 has a substantially flat body 352. A cutout 354 in the body 352 accommodates a post 356 on the frame 304, with this arrangement guiding pivoting movement between the slider 332 and post 356 around an axis 358 defined by the post 356. The cutout 354 is contiguous with an oval cutout 360, which accommodates the shaft 326 and pinion gear 324.

Movement of the slider 332 is limited in the first and second positions by an edge 362 bounding a cutout 364. A screw 366 extends through the cutout 364 into the frame 304 and abuts to one end 368 of the edge 362 with the slider 332 in the second position and the other end 370 of the cutout 360 with the slider 332 in the first position.

The slider 332 is normally biased towards its first position by a formed, wire spring 372, which is coiled and has one arm 374 abutted to a screw 376 on the frame 304 and another arm 378 projecting through the slider 332.

The kick lever 334 and slider 332 cooperate through a post 380 and slot 382. The slot 382 is not closely matched to the cross section of the post 380 but instead is oval so that the edge 384 bounding the slot 382 guides the post 380 in rotation around the pin axis 386 and as well allows the kick lever 334 to shift by translation transversely to the axis 386.

If the slot 382 were matched to the cross section of the post 380, as in the prior art, and the kick lever 334 pivoted towards its engaged position, it could encounter one of the teeth 348, whereupon continued movement of the kick lever 334 towards its engaged position would be arrested. With the elongate slot 382, the projection 346 is allowed to slide over the tooth 348, to which it abuts, to a position between adjacent teeth 348.

This action is assisted by the overcenter spring 350, which is defined by a single, formed piece of wire 388. The wire 388 is coiled, with one arm 390 thereon attached to a post 392 on the frame 304, and the other arm 394 directed through a tab 396 on the kick lever 334.

Figure 19:
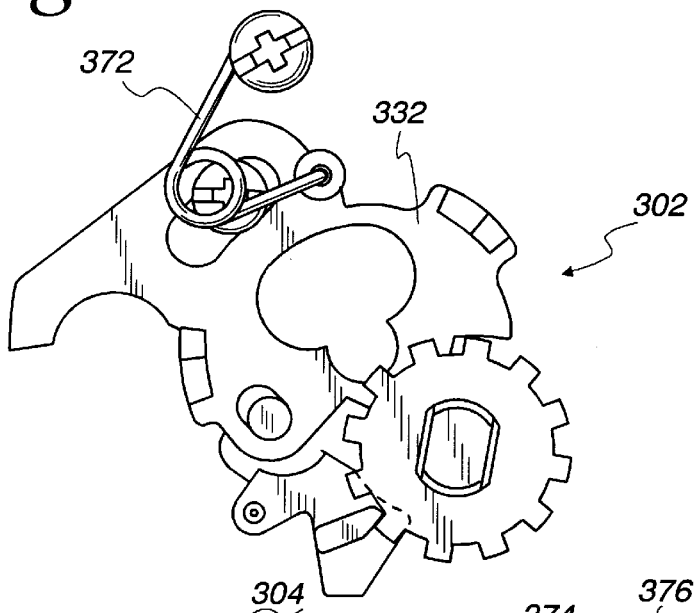
FIG. 19 is a view as in FIG. 18 with the reel operating mechanism in transition between retrieve and cast states.

In the FIG. 18 state, the arm 394 exerts a force on the kick lever 334 to cause an edge 398 on the post 380 to bear on the slot edge 384 to urge the slider 332 towards the first position shown in FIG. 18, thereby augmenting the bias force developed by the spring 372. Once the slider 332 approaches its second position, as shown in FIG. 19, the spring 350 assumes an overcenter position wherein the arm 394 exerts a counterclockwise force on the kick lever 334, thereby urging the projection 346 to between adjacent teeth 348, as shown in FIGS. 19 and 20.

The projection 346 has a tapered end 400 which terminates at a relatively sharp apex 402, with the tapered end 400 guiding the kick lever 334 fully into the engaged position to either side of a tooth 348 which the apex 402 abuts.

Figure 21:
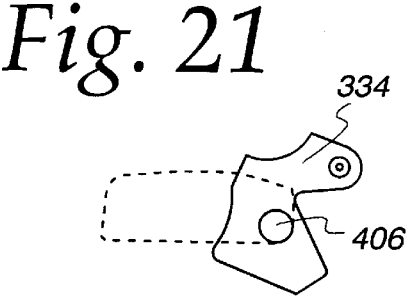
FIG. 21 is an enlarged, fragmentary, side elevation view of a kick lever on the antijamming structure showing the cooperation of a pin on the kick lever and a guide slot therefor with the reel operating mechanism in a retrieve state.
Figure 22:
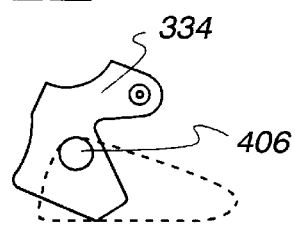
FIG. 22 is a view as in FIG. 21 with the reel operating mechanism in a cast state.

The kick lever 334 effectively "floats" between its engaged and disengaged positions. To prevent unimpeded rotation of the kick lever 334 in a clockwise direction around the post 380, a projection 406 (see FIGS. 21 and 22) is provided on the kick lever 334 and projects oppositely to the post 380. The projection 406 moves guidingly within a slot 408 defined on the frame 304 between the positions shown in FIGS. 21 and 22 corresponding respectively to the retrieve and cast states for the operating mechanism.

With this arrangement, the operation of the reel operating mechanism 310 and actuating mechanism 302 are not significantly affected while preventing the problem of jamming that has occurred in the prior art reels of this type employing the mechanism as shown in FIGS. 15–20, without the post 380 and elongate slot 382 of the invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A fishing reel comprising:

a frame;

a line carrying spool;

first means for mounting the line carrying spool to the frame for rotation about a first axis; and a reel operating mechanism that is placeable selectively in a) a cast state and b) a retrieve state, said reel operating mechanism including a crank handle with a crank shaft and second means responsive to operation of the crank handle for a) rotating the line carrying spool around the first axis to retrieve line onto the spool with the reel operating mechanism in a retrieve state and b) changing the reel operating mechanism from the cast state into the retrieve state, said second means comprising a slider that is movable relative to the frame between a first position with the reel operating mechanism in the retrieve state and a second position with the reel operating mechanism in the cast state, third means on the frame for disengaging the second means to allow the line carrying spool to be rotated without operating the crank handle as an incident of the slider moving from its first position into its second position, and fourth means cooperating between the slider and at least one of the frame and crank shaft for releasably maintaining the slider in the second position and for allowing the slider to be moved from the second position into the first position as an incident of the crank handle being operated, said fourth means including a kick lever and fifth means cooperating between the kick lever and slider for both a) guiding relative pivoting movement between the kick lever and slider about a second axis that changes relative to the frame as an incident of the kick lever and slider relatively repositioning, and b) allowing limited movement of the kick lever relative to the slider in a path transversely to the second axis.

2. The fishing reel according to claim 1 including means cooperating between the slider and frame for normally biasing the slider towards the first position.

3. The fishing reel according to claim 2 wherein the means cooperating between the slider and frame for biasing the slider towards the first position comprises a single, formed piece of wire.

4. The fishing reel according to claim 1 wherein the reel operating mechanism includes a thumb button, means cooperating between the thumb button and frame for mounting the thumb button to the frame for movement relative to the frame between engaged and disengaged positions and means cooperating between the thumb button and slider for moving the slider from the first position into the second position as an incident of the thumb button moving from the disengaged position into the engaged position.

5. The fishing reel according to claim 1 wherein the second means includes a pinion gear, means cooperating between the pinion gear and line carrying spool for transmitting a torque applied to the pinion gear to the line carrying spool to effect rotation thereof and means cooperating between the crank shaft and pinion gear for transmitting a torque applied to the crank shaft to the pinion gear to effect rotation thereof and the third means comprises means for repositioning the pinion gear relative to at least one of the crank shaft and line carrying spool to allow the pinion gear to rotate without transmitting a torque through the pinion gear to the one of the crank shaft and line carrying spool.

6. The fishing reel according to claim 5 wherein the third means includes a yoke and means cooperating between the frame and yoke for mounting the yoke for movement relative to the frame axially relative to the first axis between a first position and a second position, said second means further including means cooperating between the slider and yoke for moving the yoke from its first position into its second position as an incident of the slider moving from its first position into its second position and means cooperating between the yoke and pinion gear for repositioning the pinion gear relative to the at least one of the crank shaft and line carrying spool to allow the pinion gear to rotate without transmitting a torque through the pinion gear to the one of the crank shaft and line carrying spool as an incident of the yoke moving from its first position into its second position.

7. A fishing reel comprising:

a frame;

a line carrying spool;

first means for mounting the line carrying spool to the frame for rotation about a first axis; and a reel operating mechanism that is placeable selectively in a) a cast state and b) a retrieve state, said reel operating mechanism including a crank handle with a crank shaft and second means responsive to operation of the crank handle for a) rotating the line carrying spool around the first axis to retrieve the line onto the spool with the reel operating mechanism in a retrieve state and b) changing the reel operating mechanism from the cast state into the retrieve state, said second means comprising a slider that is movable relative to the frame between a first position with the reel operating mechanism in the retrieve state and a second position with the reel operating mechanism in the cast state, third means on the frame for disengaging the second means to allow the line carrying spool to be rotated without operating the crank handle as an incident of the slider moving from its first position into its second position, and fourth means cooperating between the slider and at least one of the frame and crank shaft for releasably maintaining the slider in the second position and for allowing the slider to be moved from the second position into the first position as an incident of the crank handle being operated, said fourth means including a kick lever and fifth means cooperating between the kick lever and slider for both guiding relative pivoting movement between the kick lever and slider about a second axis and allowing limited movement of the kick lever relative to the slider in a path transversely to the second axis, wherein the fifth means comprises a post on one of the kick lever and slider and a slot for receiving the post on the other of the kick lever and slider.

8. A fishing reel comprising:

a frame;

a line carrying spool;

first means for mounting the line carrying spool to the frame for rotation about a first axis; and a reel operating mechanism that is placeable selectively in a) a cast state and b) a retrieve state, said reel operating mechanism including a crank handle with a crank shaft and second means responsive to operation of the crank handle for a) rotating the line carrying spool around the first axis to retrieve line onto the spool with the reel operating mechanism in a retrieve state and b) changing the reel operating mechanism from the cast state into the retrieve state, said second means comprising a slider that is movable relative to the frame between a first position with the reel operating mechanism in the retrieve state and a second position with the reel operating mechanism in the cast state, third means on the frame for disengaging the second means to allow the line carrying spool to be rotated without operating the crank handle as an incident of the slider moving from its first position into its second position, and fourth means cooperating between the slider and at least one of the frame and crank shaft for releasably maintaining the slider in the second position and for allowing the slider to be moved from the second position into the first position as an incident of the crank handle being operated, said fourth means including a kick lever and fifth means cooperating between the kick lever and slider for both guiding relative pivoting movement between the kick lever and slider about a second axis and allowing limited movement of the kick lever relative to the slider in a path transversely to the second axis, wherein the fifth means comprises a post on one of the kick lever and slider and a slot for receiving the post on the other of the kick lever and slider, wherein the slot has an oval shape.

9. A fishing reel comprising:

a frame;

a line carrying spool;

first means for mounting the line carrying spool to the frame for rotation about a first axis; and a reel operating mechanism that is placeable selectively in a) a cast state and b) a retrieve state, said reel operating mechanism including a crank handle with a crank shaft and second means responsive to operation of the crank handle for a) rotating the line carrying spool around the first axis to retrieve the line onto the spool with the reel operating mechanism in a retrieve state and b) changing the reel operating mechanism from the cast state into the retrieve state, said second means comprising a slider that is movable relative to the frame between a first position with the reel operating mechanism in the retrieve state and a second position with the reel operating mechanism in the cast state, third means on the frame for disengaging the second means to allow the line carrying spool to be rotated without operating the crank handle as an incident of the slider moving from its first position into its second position, and fourth means cooperating between the slider and at least one of the frame and crank shaft for releasably maintaining the slider in the second position and for allowing the slider to be moved from the second position into the first position as an incident of the crank handle being operated, said fourth means including a kick lever and fifth means cooperating between the kick lever and slider for both guiding relative pivoting movement between the kick lever and slider about a second axis that changes relative to the frame as an incident of the kick lever and slider relatively repositioning and allowing limited movement of the kick lever relative to the slider in a path transversely to the second axis, wherein there are means cooperating between the kick lever and frame for guiding movement of the kick lever relative to the frame between an engaged position and a disengaged position.

10. The fishing reel according to claim 9 wherein the crank shaft has a rotational axis, the kick lever has a projection, there is a ratchet element on the crank shaft with a plurality of teeth spaced around the rotational axis of the crank shaft and with the kick lever in the engaged position the projection on the kick lever resides between adjacent teeth and blocks rotation of the crank shaft in one direction around the rotational axis of the crank shaft.

11. The fishing reel according to claim 9 including spring means for biasing the kick lever into each of the engaged and disengaged positions.

12. The fishing reel according to claim 11 wherein the spring means comprises a single piece of formed wire.

13. A fishing reel comprising:

a frame;

a line carrying spool;

first means for mounting the line carrying spool to the frame for rotation about a first axis; and a reel operating mechanism that is placeable selectively in a) a cast state and b) a retrieve state, p1 said reel operating mechanism including a crank handle with a crank shaft and second means responsive to operation of the crank handle for a) rotating the line carrying spool around the first axis to retrieve line onto the spool with the reel operating mechanism in a retrieve state and b) changing the reel operating mechanism from the cast state into the retrieve state, said second means comprising a slider that is movable relative to the frame between a first position with the reel operating mechanism in the retrieve state and a second position with the reel operating mechanism in the cast state, third means on the frame for disengaging the second means to allow the line carrying spool to be rotated without operating the crank handle as an incident of the slider moving from its first position into its second position, and fourth means cooperating between the slider and at least one of the frame and crank shaft for releasably maintaining the slider in the second position and for allowing the slider to be moved from the second position into the first position as an incident of the crank handle being operated, said fourth means including a kick lever and fifth means cooperating between the kick lever and slider for both a) guiding relative pivoting movement between the kick lever and slider about a second axis that changes relative to the frame as an incident of the kick lever and slider relatively repositioning, and b) allowing limited movement of the kick lever relative to the slider in a path transversely to the second axis, wherein there are means cooperating between the kick lever and frame for guiding movement of the kick lever relative to the frame between an engaged position and a disengaged position, wherein the means cooperating between the kick lever and frame comprises a projection on one of the kick lever and frame and a slot for receiving the projection on the other of the kick lever and frame.

14. A fishing reel comprising:

a line carrying spool;

first means for mounting the line carrying spool to the frame; and a reel operating mechanism that is placeable selectively in a) a cast state and b) a retrieve state, said reel operating mechanism including a crank handle and second means responsive to operation of the crank handle for a) directing line onto the line carrying spool and b) changing the reel operating mechanism from the cast state into the retrieve state, said second means comprising a slider that is movable relative to the frame between a first position with the reel operating mechanism in the retrieve state and second position with the reel operating mechanism in the cast state, third means on the frame for disengaging the second means to allow the line carrying spool to be rotated without operating the crank handle as an incident of the slider moving from the first position into the second position, and fourth means cooperating between the slider and at least one of the frame and crank shaft for both releasably maintaining the slider in the second position and allowing the slider to be moved from the second position into the first position as an incident of the crank handle being operated, said fourth means including a ratchet with a plurality of spaced teeth thereon, a kick lever with a projection thereon, and fifth means cooperating between the kick lever and slider for both a) guiding relative pivoting movement between the kick lever relative to the slider about a second axis that changes relative to the frame as an incident of the kick lever and slider relatively repositioning, and b) allowing limited movement of the kick lever relative to the slider in a path transversely to the second axis between an engaged position wherein the projection on the kick lever extends between adjacent teeth on the ratchet and a disengaged position, the position of the second axis changing relative to the frame a an incident of the kick lever and slider relatively repositioning, said second means further including sixth means on at least one of the ratchet, frame, slider and kick lever to prevent jamming of the kick lever by abutment of the projection on the kick lever against one of the ratchet teeth as the kick lever moves from its disengaged position towards its engaged position, said sixth means comprising means for causing translatory movement of the kick lever relative to the slider as an incident of the projection on the kick lever abutting to one of the ratchet teeth, whereby the projection is allowed to move into the engaged position.

15. The fishing reel according to claim 14 wherein the sixth means comprises means for guiding translatory movement of the kick lever in an arcuate path relative to the slider.

16. The fishing reel according to claim 14 wherein the slider comprises a substantially flat plate.

17. The fishing reel according to claim 14 including means cooperating between the slider and frame for normally biasing the slider towards one of the first and second positions.

18. The fishing reel according to claim 14 including spring means for biasing the kick lever into each of the engaged and disengaged positions.

19. The fishing reel according to claim 14 wherein there are means cooperating between the kick lever and frame for guiding movement of the kick lever relative to the frame between the engaged position and the disengaged position.

* * * * *